United States Patent
Kinoshita

(10) Patent No.: US 8,818,603 B2
(45) Date of Patent: Aug. 26, 2014

(54) VEHICLE, CONTROL APPARATUS FOR VEHICLE, AND CONTROL METHOD FOR VEHICLE

(75) Inventor: Gohki Kinoshita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/984,453

(22) PCT Filed: Feb. 10, 2012

(86) PCT No.: PCT/IB2012/000234
§ 371 (c)(1),
(2), (4) Date: Aug. 8, 2013

(87) PCT Pub. No.: WO2012/110870
PCT Pub. Date: Aug. 23, 2012

(65) Prior Publication Data
US 2013/0317685 A1 Nov. 28, 2013

(30) Foreign Application Priority Data
Feb. 14, 2011 (JP) .................................. 2011-028817

(51) Int. Cl.
*B60L 11/00* (2006.01)
*B60W 10/24* (2006.01)
(52) U.S. Cl.
USPC ........................................ 701/22; 180/65.275
(58) Field of Classification Search
USPC ........................................ 701/22; 180/65.275
See application file for complete search history.

(56) References Cited

U.S. PATENT DOCUMENTS

| | | | |
|---|---|---|---|
| 6,392,316 B1 | 5/2002 | Yoshioka et al. | |
| 7,891,451 B2 * | 2/2011 | Oyobe et al. | 180/65.275 |
| 2011/0093152 A1 | 4/2011 | Harumoto et al. | |
| 2012/0065827 A1 * | 3/2012 | Kimura et al. | 701/22 |
| 2012/0109443 A1 * | 5/2012 | Takahashi et al. | 701/22 |
| 2013/0311026 A1 * | 11/2013 | Endo et al. | 701/22 |

FOREIGN PATENT DOCUMENTS

| | | |
|---|---|---|
| EP | 2065268 A1 | 6/2009 |
| JP | 2006-174619 A | 6/2006 |
| JP | 2006-230102 A | 8/2006 |
| JP | 2008-302852 A | 12/2008 |
| JP | 2009-137340 A | 6/2009 |
| JP | 2009-248822 A | 10/2009 |
| JP | 2009-248946 A | 10/2009 |
| JP | 2010-036604 A | 2/2010 |
| JP | 2010-052610 A | 3/2010 |

* cited by examiner

*Primary Examiner* — Yonel Beaulieu
(74) *Attorney, Agent, or Firm* — Gifford, Krass, Sprinkle, Anderson & Citkowski, P.C.

(57) ABSTRACT

A vehicle includes a first electric storage device for supplying an electric power to an electric rotating machine, a second electric storage device with a lower voltage than the first electric storage device for supplying an electric power to an electric component, a converter, and a control unit. The control unit controls the converter such that a voltage of a electric power supplied from the first electric storage device to the second electric storage device becomes equal to a target voltage. Further, the control unit sets the target voltage to a first voltage if a system stop period for a system of the vehicle is longer than a first period, and sets the target voltage to a second voltage, which is lower than the first voltage, if the system stop period is equal to or shorter than the first period.

13 Claims, 9 Drawing Sheets

VEHICLE, CONTROL APPARATUS FOR VEHICLE, AND CONTROL METHOD FOR VEHICLE

BACKGROUND OF THE INVENTION

1. Field of the Invention

The invention relates to a vehicle mounted with an electric rotating machine, a control apparatus for the vehicle, and a control method for the vehicle.

2. Description of Related Art

A hybrid vehicle mounted with an electric rotating machine and an internal combustion engine includes a electric storage device for driving the vehicle and an auxiliary battery. For example, in Japanese Patent Application Publication No. 2008-302852 (JP-A-2008-302852), there is described an art of charging an auxiliary battery using the energy stored in a electric storage device for driving a vehicle when the storage amount of the electric storage device for driving the vehicle is equal to or larger than a predetermined amount.

In some cases, the auxiliary battery cannot provide sufficient performance when left unused for a long time. Thus, it is desirable to charge the auxiliary battery at a time when a system of the vehicle is activated, and stop charging the auxiliary battery when once it is determined that the auxiliary battery has not been left unused for a long time. However, in the case where conditions for determining whether or not the auxiliary battery has been left unused for a long time include a condition that the initial start of the internal combustion engine be completed, it may take a long time until it is determined whether or not the auxiliary battery has been left unused for a long time if the vehicle continues to travel with the internal combustion engine stopped. In this case, even when the auxiliary battery has not been left unused for a long time, the auxiliary battery may continue to be charged for a long time. As a result, the amount of electric power consumption may increase to cause a deterioration in fuel economy.

In a control apparatus for a hybrid vehicle described in JP-A-2008-302852, such problems may not be taken into account and thus remain unsolved.

SUMMARY OF THE INVENTION

The invention provides a vehicle, a control apparatus for the vehicle, and a control method for the vehicle that avoid the unnecessary consumption of electric power and restrains a deterioration in fuel economy.

A first aspect of the invention relates to a vehicle including a first electric storage device that supplies an electric power to an electric rotating machine as a drive source, a second electric storage device that supplies an electric power to an electric component different from the electric rotating machine and has a lower voltage than the first electric storage device, a converter that adjusts a voltage of the electric power supplied from the first electric storage device and supplies the voltage-adjusted electric power at least to the second electric storage device, and a control unit that controls the converter such that the voltage of the electric power supplied from the first electric storage device to the second electric storage device becomes equal to a target voltage. The control unit sets the target voltage to a first voltage if a system stop period from a last stop time point when a system of the vehicle is stopped to an activation time point when the system of the vehicle is activated is longer than a first period, and sets the target voltage to a second voltage, which is lower than the first voltage, if the system stop period is equal to or shorter than the first period.

The first voltage may be a voltage at which the second electric storage device is charged with the electric power of the first electric storage device.

The control unit may set the target voltage to the first voltage at the activation time point.

The vehicle may further include an operation unit that is operated by a driver. In this case, the activation time point may be a time point at which the operation unit is operated when the system of the vehicle is in a stopped state, the stop time point may be a time point at which the operation unit is operated when the system of the vehicle is in an activated state, and the system stop period may be a period from the last stop time point to the activation time point after the last stop point.

When the system stop period is longer than the first period, the control unit may set the target voltage to the second voltage if an elapsed time from the activation time point is longer than a second period, and set the target voltage to the first voltage if an elapsed time from the activation time point is equal to or shorter than the second period The second period may be shorter than the first period.

The drive source may include an internal combustion engine.

The control unit may set the target voltage to the second voltage after completion of preheating of an air-fuel ratio sensor that is provided in the internal combustion engine, if the system stop period is equal to or shorter than the first period.

The control unit may determine that the preheating is completed if start of the internal combustion engine is completed after the activation time point, and set the target voltage to the second voltage.

The control unit may determine that the preheating is completed if the elapsed time from the activation time point is longer than a third period, and set the target voltage to the second voltage.

The control unit may set the target voltage to the first voltage immediately before the internal combustion engine is started for a first time after the activation time point, and set the target voltage to the second voltage when the internal combustion engine is stopped.

A second aspect of the invention relates to a control apparatus for a vehicle that is mounted with a first electric storage device, a second electric storage device, and a converter. The control apparatus includes a control unit that sets a target voltage to a first voltage if a system stop period from a last stop time point when a system of the vehicle is stopped to an activation time point when the system of the vehicle is activated is longer than a first period, sets the target voltage to a second voltage, which is lower than the first voltage, if the system stop period is equal to or shorter than the first period, and controls the converter such that a voltage of an electric power supplied from the first electric storage device to the second electric storage device becomes equal to the target voltage. The first electric storage device supplies an electric power to an electric rotating machine as a drive source. The second electric storage device supplies an electric power to an electric component different from the electric rotating machine, and has a lower voltage than the first electric storage device. The converter adjusts the voltage of the electric power supplied from the first electric storage device, and supplies the voltage-adjusted electric power at least to the second electric storage device.

A third aspect of the invention relates to a control method for a vehicle that is mounted with a first electric storage device, a second electric storage device, and a converter. The control methods including: setting a target voltage to a first voltage if a system stop period from a last stop time point when a system of the vehicle is stopped to an activation time point when the system of the vehicle is activated is longer than a first period; setting the target voltage to a second voltage, which is lower than the first voltage, if the system stop period is equal to or shorter than the first period; and controlling the converter such that a voltage of an electric power supplied from the first electric storage device to the second electric storage device becomes equal to the target voltage. The first electric storage device supplies an electric power to an electric rotating machine as a drive source. The second electric storage device supplies an electric power to an electric component different from the electric rotating machine, and has a lower voltage than the first electric storage device. The converter adjusts the voltage of the electric power supplied from the first electric storage device, and supplies the voltage-adjusted electric power at least to the second electric storage device.

According to the aspects of the invention, for example, in the hybrid vehicle, regardless of whether or not the internal combustion engine is started, it is possible to determine whether or not the second electric storage device is left unused for a long time, on the basis of the left period for which the second electric storage device is left unused. Thus, the determination on whether or not the second electric storage device is left unused for a long time is prevented from taking a long time. Further, the control of the converter can be swiftly performed depending on whether or not the second electric storage device is left unused for a long time. Accordingly, it is possible to provide a vehicle, a control apparatus for the vehicle, and a control method for the vehicle that restrain a deterioration in fuel economy while avoiding the unnecessary consumption of electric power.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The embodiments of the invention will be described hereinafter with reference to the drawings. In the following description, like components are denoted by like reference symbols respectively. The components denoted by the same reference symbol are identical to one another in name and function as well. Accordingly, the detailed description of such components will not be repeated.

First Embodiment

Figure 1:
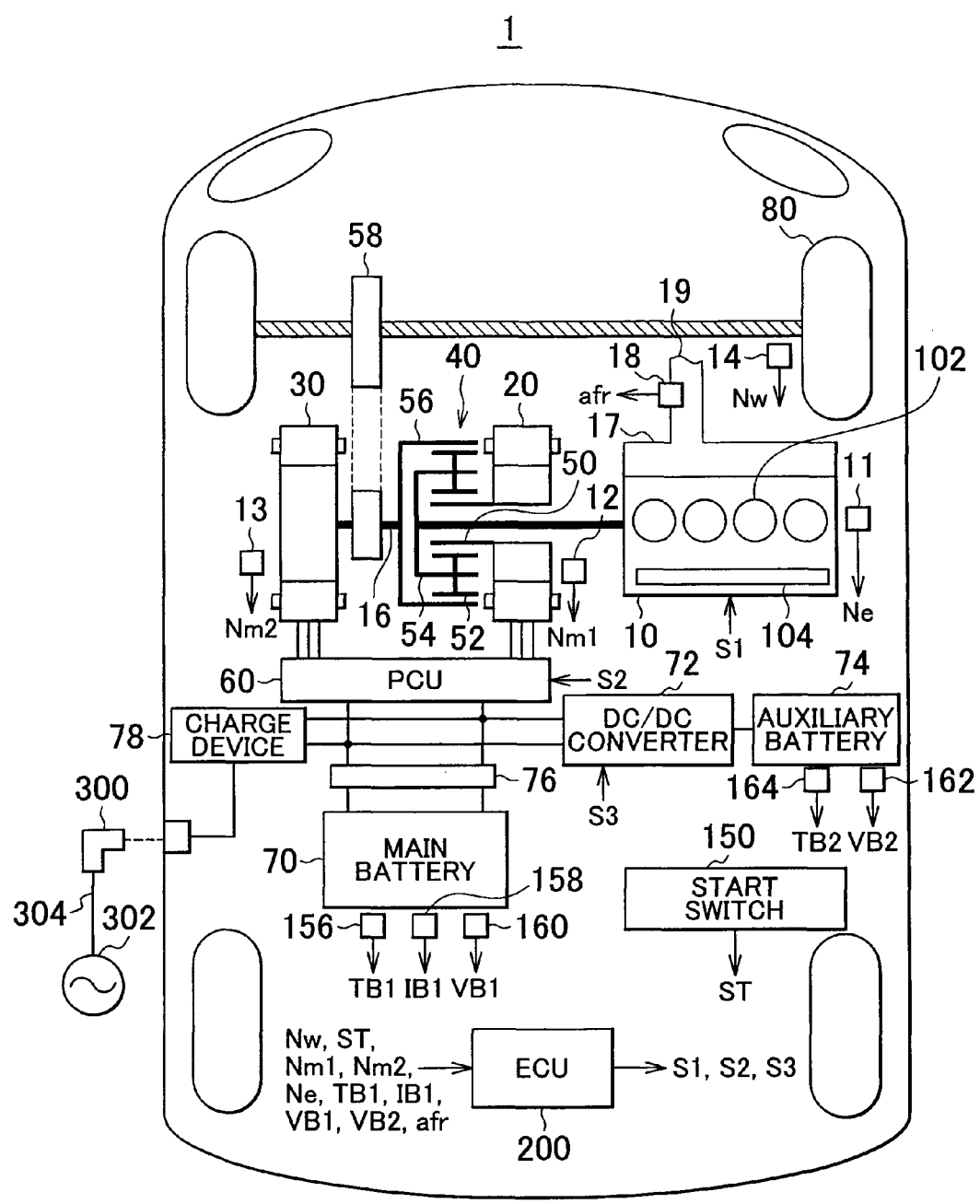
FIG. 1 is an overall block diagram of a vehicle according to the first embodiment of the invention.

An overall block diagram of a vehicle 1 according to this embodiment of the invention will be described with reference to FIG. 1. The vehicle 1 includes an engine 10, a drive shaft 16, a first motor-generator (hereinafter referred to as a first MG) 20, a second motor-generator (hereinafter referred to as a second MG) 30, a power splitting device 40, a reducer 58, a power control unit (a PCU) 60, a main battery 70, a DC/DC converter 72, an auxiliary battery 74, a system main relay (hereinafter referred to as an SMR) 76, a charge device 78, a driving wheel 80, a start switch 150, and an electronic control unit (an ECU) 200.

This vehicle 1 is propelled by a driving force that is output from at least one of the engine 10 and the second MG 30. A power generated by the engine 10 is split into two paths by the power splitting device 40. One of the two paths is a path through which the power is transmitted to the driving wheel 80 via the reducer 58, and the other path is a path through which the power is transmitted to the first MG 20.

The first MG 20 and the second MG 30 are, for example, three-phase alternating-current electric rotating machines. The first MG 20 and the second MG 30 are driven by the PCU 60.

The first MG 20 functions as a generator that generates an electric power through the use of the power of the engine 10 split by the power splitting device 40 to charge the main battery 70 via the PCU 60. Further, the first MG 20 is supplied with an electric power from the main battery 70 to rotate a crankshaft as an output shaft of the engine 10. Thus, the first MG 20 functions as a starter that starts the engine 10.

The second MG 30 functions as a drive motor that imparts a driving force to the driving wheel 80 through the use of at least one of the electric power stored in the main battery 70 and the electric power generated by the first MG 20. Further, the second MG 30 functions as a generator that charges the main battery 70 via the PCU 60 through the use of the electric power generated through regenerative braking.

The engine 10 is, for example, an internal combustion engine such as a gasoline engine, a diesel engine, or the like. The engine 10 includes a plurality of cylinders 102, a fuel injection device 104 that supplies fuel to each of the plurality of the cylinders 102, an exhaust manifold 17, and an exhaust pipe 19. The fuel injection device 104 injects a suitable amount of fuel into each of the cylinders at a suitable timing, or stops injecting fuel into each of the cylinders, on the basis of a control signal S1 from the ECU 200.

The engine 10 is provided with an engine rotational speed sensor 11 that detects a rotational speed Ne of the crankshaft of the engine 10 (hereinafter referred to as an engine rotational speed). The engine rotational speed sensor 11 sends a signal indicating the detected engine rotational speed Ne to the ECU 200.

An exhaust pipe 19 is connected to the exhaust manifold 17. The exhaust gas discharged from the plurality of the cylinders 102 to the exhaust manifold 17 flows through the exhaust pipe 19. The exhaust pipe 19 is provided with an air-fuel ratio sensor 18. The air-fuel ratio sensor 18 detects an air-fuel ratio of the exhaust gas flowing through the exhaust pipe 19. The air-fuel ratio sensor 18 sends a signal afr indicating the detected air-fuel ratio to the ECU 200.

The air-fuel ratio sensor 18 has a built-in resistor. The ECU 200 supplies an electric power to the air-fuel ratio sensor 18 before the start of the engine 10, thereby heating (hereinafter referred to as preheating) the air-fuel ratio sensor 18 such that the temperature of the air-fuel ratio sensor 18 becomes equal to or higher than a predetermined temperature. The difference between the temperature of the air-fuel ratio sensor 18 and the temperature of exhaust gas can be reduced by heating the air-fuel ratio sensor 18 until the temperature thereof becomes equal to or higher than the predetermined temperature.

The ECU 200 supplies an electric power to the air-fuel ratio sensor 18 to perform preheating at a time point when the start switch 150 is operated by a driver, at a time point when a system of the vehicle 1 is activated, or immediately before the start of the engine 10 (a predetermined time prior to a start timing of the engine 10). It should be noted that the air-fuel ratio sensor 18 may be provided with a heater used exclusively for heating the air-fuel ratio sensor 18.

The power splitting device 40 mechanically couples three elements, namely, the drive shaft 16 that rotates the driving wheel 80, the output shaft of the engine 10, and a rotational shaft of the first MG 20 to one another. By using one of the aforementioned three elements as a reactive force element, the power splitting device 40 allows a power to be transmitted between the other two elements. A rotational shaft of the second MG 30 is coupled to the drive shaft 16.

The power splitting device 40 is a planetary gear mechanism including a sun gear 50, a pinion gear 52, a carrier 54, and a ring gear 56. The pinion gear 52 meshes with each of the sun gear 50 and the ring gear 56. The carrier 54 supports the pinion gear 52 such that the pinion gear 52 can rotate around its own axis, and is coupled to the crankshaft of the engine 10. The sun gear 50 is coupled to the rotational shaft of the first MG 20. The ring gear 56 is coupled to a rotational shaft of the second MG 30 and the reducer 58 via the drive shaft 16.

The reducer 58 transmits the power from the power splitting device 40 and the second MG 30 to the driving wheels 80. Further, the reducer 58 transmits a reactive force from a road surface, which is received by the driving wheels 80, to the power splitting device 40 and the second MG 30.

The PCU 60 converts a direct-current electric power stored in the main battery 70 into an alternating-current electric power for driving the first MG 20 and the second MG 30. The PCU 60 includes a step-up converter (not shown) and an inverter (not shown), which are controlled on the basis of a control signal S2 from the ECU 200. The step-up converter steps up the voltage of a direct-current electric power received from the main battery 70, and outputs the stepped-up voltage to the inverter. The inverter converts the direct-current electric power output by the step-up converter into an alternating-current electric power, and outputs the alternating-current electric power to the first MG 20 and/or the second MG 30. Thus, the first MG 20 and/or the second MG 30 are/is driven through the use of the electric power stored in the main battery 70. Further, the inverter converts an alternating-current electric power generated by the first MG 20 and/or the second MG 30 into a direct-current electric power, and outputs the direct-current electric power to the step-up converter. The step-up converter steps down the voltage of the direct-current electric power output by the inverter, and outputs the stepped-down voltage to the main battery 70. Thus, the main battery 70 is charged through the use of the electric power generated by the first MG 20 and/or the second MG 30. It should be noted that the step-up converter may be omitted.

The main battery 70 is a electric storage device, which is a rechargeable direct-current electric power supply. The main battery 70 is connected to the PCU 60 via an SMR 76. For example, a secondary battery such as a nickel hydride battery, a lithium-ion battery, or the like is used as the main battery 70. The voltage of the main battery 70 is about 200 V. The main battery 70 is charged through the use of the electric power generated by the first MG 20 and/or the second MG 30 as described above. It should be noted that the main battery 70 is not limited to a secondary battery, but may be any battery that generates a direct-current voltage, for example, a capacitor, a solar battery, a fuel cell, or the like.

The main battery 70 is provided with a first battery temperature sensor 156 that detects a battery temperature TB1 of the main battery 70, a current sensor 158 that detects a current IB1 of the main battery 70, and a first voltage sensor 160 that detects a voltage VB1 of the main battery 70.

The SMR 76 is switched from one of a conductive state and a shutoff state to the other state, on the basis of a control signal from the ECU 200. The conductive state is a state in which the main battery 70 and the PCU 60 are electrically connected to each other. The shutoff state is a state in which the main battery 70 and the PCU 60 are electrically shut off from each other.

The battery temperature sensor 156 sends a signal indicating the battery temperature TB1 to the ECU 200. The current sensor 158 sends a signal indicating the current IB1 to the ECU 200. The first voltage sensor 160 sends a signal indicating the voltage VB1 to the ECU 200.

The DC/DC converter 72 charges the auxiliary battery 74 through the use of the electric power of the main battery 70, and supplies electric power to electric components other than the first MG 20 and the second MG 30 (hereinafter referred to as auxiliary devices). The ECU 200 generates a control signal S3 such that the output voltage of the DC/DC converter 72 becomes equal to a target voltage, and sends the generated control signal S3 to the DC/DC converter 72. A positive electrode terminal of the DC/DC converter 72 is connected to an electric power line PL that connects a positive electrode terminal of the PCU 60 and a positive electrode terminal of the main battery 70 to each other. A negative electrode terminal of the DC/DC converter 72 is connected to a ground line NL that connects a negative electrode terminal of the PCU 60 and a negative electrode terminal of the main battery 70 to each other.

The auxiliary battery 74 is a electric storage device that has a lower voltage than the main battery 70, and supplies electric power to the auxiliary devices. The auxiliary battery 74 will be described citing a 12-V battery as an example thereof. However, the auxiliary battery 74 may be a 24-V battery or a battery of another predetermined voltage, and is not particularly limited to the 12-V battery.

The auxiliary battery 74 is provided with a second voltage sensor 162 for detecting a voltage VB2 of the auxiliary battery 74, and a second battery temperature sensor 164 that detects a battery temperature TB2 of the auxiliary battery 74. The second voltage sensor 162 sends a signal indicating the voltage VB2 of the auxiliary battery 74 to the ECU 200.

The start switch 150 is, for example, a touch-tone switch. The start switch 150 may also be designed such that a key is inserted into a key cylinder and rotated to a predetermined position. The start switch 150 is connected to the ECU 200. In response to the operation of the start switch 150 by the driver, the start switch 150 sends a signal ST to the ECU 200.

In the case of receiving the signal ST, for example, if the system of the vehicle 1 is in a stopped state, the ECU 200 determines that it has received an activation command, and shifts the system of the vehicle 1 from a stopped state to an activated state. Further, in the case of receiving the signal ST when the system of the vehicle 1 is in an activated state, the ECU 200 determines that it has received a stop command, and shifts the system of the vehicle 1 from an activated state to a stopped state. In the following description, the operation of the start switch 150 by the driver in the case where the system of the vehicle 1 is in an activated state will be referred to as an IG-off operation, and the operation of the start switch 150 by the driver in the case where the system of the vehicle 1 is in a stopped state will be referred to as an IG-on operation. When the system of the vehicle 1 shifts to an activated state, a plurality of components necessary for the traveling of the vehicle 1 become operable by, for example, being supplied with electric power. That is, the vehicle 1 becomes capable of starting off. On the other hand, when the system of the vehicle 1 shifts to a stopped state, some of the plurality of the components necessary for the traveling of the vehicle 1 become inoperable by, for example, being stopped from being supplied with electric power. When the system of the vehicle 1 shifts from a stopped state to an activated state, the SMR 76 switches a state between the main battery 70 and the PCU 60 from an electrically shutoff state to an electrically connected state.

A first resolver 12 detects a rotational speed Nm1 of the first MG 20. The first resolver 12 sends a signal indicating the detected rotational speed Nm1 to the ECU 200. A second resolver 13 detects a rotational speed Nm2 of the second MG 30. The second resolver 13 sends a signal indicating the detected rotational speed Nm2 to the ECU 200.

A wheel speed sensor 14 detects a rotational speed Nw of the driving wheel 80. The wheel speed sensor 14 sends a signal indicating the detected rotational speed Nw to the ECU 200. The ECU 200 calculates a vehicle speed V on the basis of the received rotational speed Nw. It should be noted that the ECU 200 may calculate the vehicle speed V on the basis of the rotational speed Nm2 of the second MG 30 instead of calculating the vehicle speed V on the basis of the rotational speed Nw.

The charge device 78 charges the main battery 70 through the use of the electric power that is supplied from an external electric power supply 302 via a charge plug 300 plugged into the vehicle 1. The charge plug 300 is connected to one end of a charge cable 304. The other end of the charge cable 304 is connected to the external electric power supply 302. A positive electrode terminal of the charge device 78 is connected to the electric power line PL that connects the positive electrode terminal of the PCU 60 and the positive electrode terminal of the main battery 70 to each other. A negative electrode terminal of the charge device 78 is connected to the ground line NL that connects the negative electrode terminal of the PCU 60 and the negative electrode terminal of the main battery 70 to each other. The charge device 78 may be connected to the electric power line PL and the ground line NL at positions that are located closer to the main battery 70 than the SMR 76.

The ECU 200 generates a control signal S1 for controlling the engine 10, and outputs the generated control signal S1 to the engine 10. Further, the ECU 200 generates a control signal S2 for controlling the PCU 60, and outputs the generated control signal S2 to the PCU 60. Furthermore, the ECU 200 generates a control signal S3 for controlling the DC/DC converter 72, and outputs the generated control signal S3 to the DC/DC converter 72.

The ECU 200 controls the engine 10, the PCU 60, the DC/DC converter 72, and the like, thereby controlling the entire hybrid system, namely, the charge/discharge state of the main battery 70, the voltage of the auxiliary battery 74, and the operation states of the engine 10, the first MG 20, and the second MG 30 such that the vehicle 1 is driven most efficiently.

The ECU 200 calculates a required driving force corresponding to a depression amount of an accelerator pedal (not shown) provided in a driver seat. The ECU 200 controls the torques of the first MG 20 and the second MG 30 and the output of the engine 10 in accordance with the calculated required driving force.

In the vehicle 1 having the configuration as described above, when the efficiency of the engine 10 is low in, for example, starting off, or traveling at low speeds, the vehicle 1 is propelled only by the second MG 30 with the engine 10 stopped. Further, during normal traveling, the power of the engine 10 is split into two paths by the power splitting device 40, for example. The driving wheel 80 is directly driven by a power in one path. The first MG 20 is driven by a power in the other path, and generates an electric power. In this case, the ECU 200 drives the second MG 30 through the use of the electric power generated by the first MG 20. By thus driving the second MG 30, the driving force for the driving wheel 80 is supplemented.

During deceleration of the vehicle 1, the second MG 30, which is driven by the rotation of the driving wheel 80, functions as a generator, so that regenerative braking is carried out. The electric power recovered through regenerative braking is stored into the main battery 70. It should be noted that when the remaining amount of power (hereinafter referred to as a state of charge (an SOC) in the following description) in the electric storage device decreases and the electric storage device needs to be charged, the ECU 200 increases the output of the engine 10 to increase the amount of the electric power generated by the first MG 20. Thus, the SOC of the main battery 70 increases. Further, the ECU 200 may perform the control of increasing the driving force from the engine 10, if necessary, even when the vehicle 1 travels at low speeds. For example, such cases include a case where the main battery 70 needs to be charged as described above, a case where an auxiliary device such as an air-conditioner or the like is driven, a case where the temperature of coolant for the engine 10 is raised to a predetermined temperature, and the like.

The auxiliary battery 74 mounted on the vehicle 1 having the aforementioned configuration may not be able to provide sufficient performance when left unused for a long time. Thus, it is desirable to charge the auxiliary battery 74 at a time point when the system of the vehicle 1 is activated, and to stop charging the auxiliary battery 74 when once it is determined that the auxiliary battery 74 has not been left unused for a long time. However, in the case where conditions for determining whether or not the auxiliary battery 74 has been left unused for a long time include a condition that the initial start of the engine 10 be completed, it may take a long time until it is determined whether or not the auxiliary battery 74 has been left unused for a long time if the vehicle continues to travel with the engine 10 stopped. In this case, even when the auxiliary battery 74 has not been left unused for a long time, the auxiliary battery 74 may continue to be charged for a long time. As a result, the amount of electric power consumption may increase to cause a deterioration in fuel economy.

Thus, in this embodiment of the invention, if a system stop period from a last stop time point when the system of the vehicle is stopped last time to an activation time point when the system of the vehicle is activated is longer than a first period α, the ECU 200 sets a target voltage of the DC/DC converter 72 to a first voltage VB2(0). If the system stop period is equal to or shorter than the first period α, the ECU 200 sets the target voltage to a second voltage VB2(1), which is lower than the first voltage VB2(0).

Figure 2:
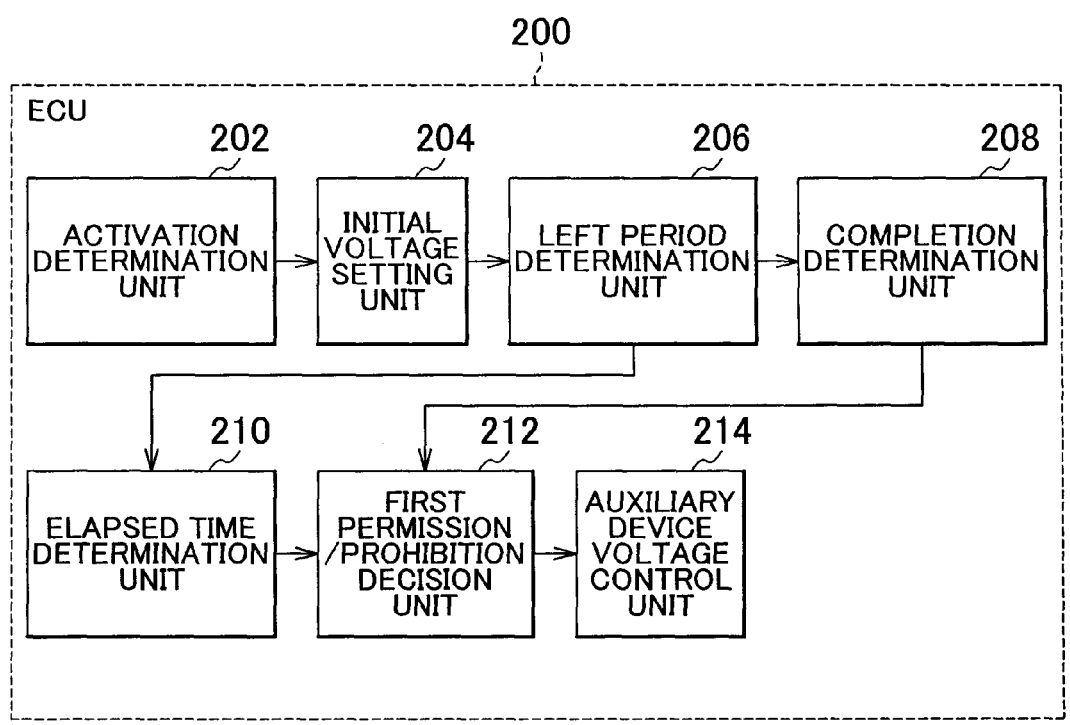
FIG. 2 is a functional block diagram of an ECU mounted on the vehicle according to the first embodiment of the invention.

FIG. 2 shows a functional block diagram of the ECU 200 mounted on the vehicle according to this embodiment of the invention. The ECU 200 includes an activation determination unit 202, an initial voltage setting unit 204, a left period determination unit 206, a completion determination unit 208, an elapsed time determination unit 210, a first permission/prohibition decision unit 212, and an auxiliary device voltage control unit 214.

The activation determination unit 202 determines whether or not the system of the vehicle 1 has shifted from a stopped state to an activated state. The activation determination unit 202 determines, on the basis of a signal from the aforementioned start switch 150, whether or not the system of the vehicle 1 has shifted from a stopped state to an activated state. It should be noted that the activation determination unit 202 may turn an activation determination flag on, for example, if the system of the vehicle 1 has shifted from a stopped state to an activated state.

If the system of the vehicle 1 has shifted from a stopped state to an activated state, the initial voltage setting unit 204 sets an initial value of the target voltage to the first voltage VB2(0), which is a voltage at the time when the system of the vehicle 1 is activated. In this embodiment of the invention, the first voltage VB2(0) may be a voltage that allows the auxiliary battery 74 to be charged at least with the electric power supplied from the DC/DC converter 72. For example, the first voltage VB2(0) may be a predetermined voltage. The internal resistance of the auxiliary battery 74 increases as the temperature of the auxiliary battery 74 falls. Thus, the lower limit of the voltage that allows the auxiliary battery 74 to be charged increases as the temperature of the auxiliary battery 74 falls. Thus, the first voltage VB2(0) may be obtained by adding a margin to the lower limit of the voltage that allows the auxiliary battery 74 to be charged. Alternatively, the first voltage VB2(0) may be determined on the basis of a result of comparison between the predetermined voltage and the lower limit of the voltage that allows the auxiliary battery 74 to be charged. For example, the first voltage VB2(0) may be determined as the higher one of the predetermined voltage and the lower limit of the voltage that allows the auxiliary battery 74 to be charged.

Further, the initial voltage setting unit 204 may set the target voltage to the first voltage VB2(0), for example, if the activation determination flag is on.

The left period determination unit 206 determines whether or not the left period for which the auxiliary battery 74 is left unused is longer than the first period α. The left period of the auxiliary battery 74 refers to the system stop period from the last stop time point for the system of the vehicle 1 to the activation time point for the system of the vehicle 1. The first period α is a predetermined period, and is a threshold for determining that the auxiliary battery 74 is left unused for a long time. The first period α is, for example, a period of several days. The left period determination unit 206 may turn a left determination flag on, for example, if the left period of the auxiliary battery 74 is longer than the first period α.

If the left period determination unit 206 determines that the left period of the auxiliary battery 74 is equal to or shorter than the first period α, the completion determination unit 208 determines whether or not the preheating of the air-fuel ratio sensor 18 is completed. In this embodiment of the invention, the completion determination unit 208 determines that the preheating of the air-fuel ratio sensor 18 is completed if the initial start of the engine 10 is completed. The initial start of the engine 10 refers to the first start of the engine 10 since the activation time point for the system of the vehicle 1. On the basis of, for example, the state of a flag that is turned on if the engine 10 is started for the first time after the activation time point for the system of the vehicle 1, the completion determination unit 208 determines whether or not the initial start of the engine 10 is completed. The completion determination unit 208 may determine whether or not the preheating of the air-fuel ratio sensor 18 is completed, for example, if a left determination flag is off, and may turn a completion determination flag on if it is determined that the preheating of the air-fuel ratio sensor 18 is completed. Especially in the case where the vehicle 1 is a plug-in hybrid vehicle, the initial start of the engine 10 may be long in coming, and a shift of the auxiliary battery 74 to a fuel economy improvement mode may be delayed if it is determined solely on the basis of the initial start of the engine 10 whether or not the preheating of the air-fuel ratio sensor 18 is completed. Thus, in the case where the vehicle 1 is a plug-in hybrid vehicle, it is desirable to determine, on the basis of information other than the initial start of the engine 10, whether or not the preheating of the air-fuel ratio sensor 18 is completed.

If the left period determination unit 206 determines that the left period of the auxiliary battery 74 is longer than the first period α, the elapsed time determination unit 210 determines whether or not the elapsed time from the activation time point for the system of the vehicle 1 is longer than a second period β. The second period β is a predetermined period shorter than the first period α, and is a period required for charging the auxiliary battery 74 left unused for a long time so that the auxiliary battery 74 provides its appropriate performance. The second period β is, for example, a period of several tens of minutes. The elapsed time determination unit 210 may determine whether or not the elapsed time from the activation time point for the system of the vehicle 1 is longer than the second period β, for example, if the left determination flag is on, and may turn an elapsed time determination flag on if it is determined that the elapsed time from the activation time point for the system of the vehicle 1 is longer than the second period β.

The first permission/prohibition decision unit 212 decides whether to permit the selection of the fuel economy improvement mode or not, on the basis of results of determinations made by the left period determination unit 206, the completion determination unit 208, and the elapsed time determination unit 210. The fuel economy improvement mode includes a mode of controlling the DC/DC converter 72 with the target voltage of the DC/DC converter 72 set to the second voltage VB2(1) that is lower than the first voltage VB2(0). The second voltage VB2(1) is not limited as long as it is lower than the first voltage VB2(0). However, the second voltage VB2(1) is a voltage that allows at least the normal operation of the electric components that are supplied with electric power by the auxiliary battery 74. The second voltage VB2(1) may be determined in accordance with the temperature of the auxiliary battery 74, may be a predetermined voltage, or may be the higher one of the voltage determined in accordance with the temperature of the auxiliary battery 74 and the predetermined voltage.

If the left period determination unit 206 determines that the left period of the auxiliary battery 74 is equal to or shorter than the first period α and the completion determination unit 208 determines that the preheating of the air-fuel ratio sensor 18 is completed, the first permission/prohibition decision unit 212 permits the selection of the fuel economy improvement mode, for example.

If it is determined that the left period of the auxiliary battery 74 is equal to or shorter than the first period α and that the preheating of the air-fuel ratio sensor 18 is not completed, the first permission/prohibition decision unit 212 prohibits the selection of the fuel economy improvement mode, for example.

Furthermore, if it is determined that the left period of the auxiliary battery 74 is longer than the first period α and the elapsed time determination unit 210 determines that the elapsed time from the activation time point for the system of the vehicle 1 is longer than the second period β, the first permission/prohibition decision unit 212 permits the selection of the fuel economy improvement mode, for example.

If it is determined that the left period of the auxiliary battery 74 is longer than the first period α and that the elapsed time from the activation time point for the system of the vehicle 1 is equal to or shorter than the second period β, the first permission/prohibition decision unit 212 prohibits the selection of the fuel economy improvement mode, for example.

If the left period determination flag is off and the completion determination flag is on or if the left period determination flag and the elapsed time determination flag are both on, the first permission/prohibition decision unit 212 may turn on a selection permission flag for the fuel economy improvement mode, for example.

Further more, if the left period determination flag and the completion determination flag are both off or if the left period determination flag is on and the elapsed time determination flag is off, the first permission/prohibition decision unit 212 may turn off the selection permission flag for the fuel economy improvement mode, for example.

If the selection of the fuel economy improvement mode is permitted, the auxiliary device voltage control unit 214 sets the target voltage of the DC/DC converter 72 to the second voltage VB2(1). Further, if the selection of the fuel economy improvement mode is prohibited, the auxiliary device voltage control unit 214 sets a target voltage of the DC/DC converter 72 to the first voltage VB2(0). The auxiliary device voltage control unit 214 controls the DC/DC converter 72 such that the voltage VB2 detected by the second voltage sensor 162 becomes equal to the set target voltage.

For example, the auxiliary device voltage control unit 214 may set the target voltage to the second voltage VB2(1) if the selection permission flag is on, and may set the target voltage to the first voltage VB2(0) if the selection permission flag is off.

In this embodiment of the invention, the activation determination unit 202, the initial voltage setting unit 204, the left period determination unit 206, the completion determination unit 208, the elapsed time determination unit 210, the first permission/prohibition decision unit 212, and the auxiliary device voltage control unit 214, all of which functions as software, are realized through the execution of a program stored in a memory by the CPU of the ECU 200, but may also be realized by hardware. It should be noted that such a program is stored in a storage medium, which is mounted on the vehicle.

Figure 3:
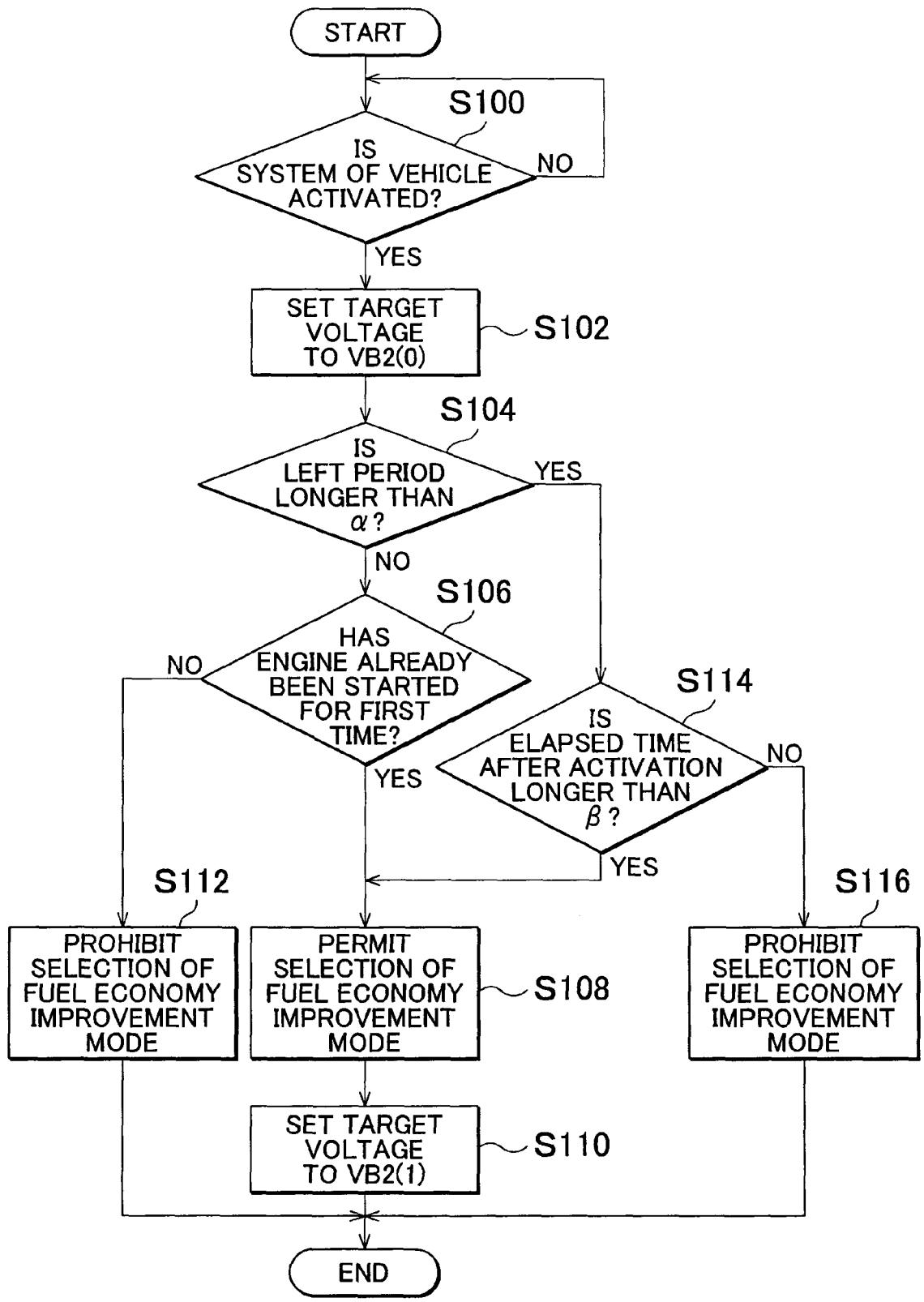
FIG. 3 is a flowchart showing a control structure of a program executed by the ECU mounted on the vehicle according to the first embodiment of the invention.

Referring to FIG. 3, the control structure of the program executed by the ECU 200 mounted on the vehicle according to this embodiment of the invention will be described. The ECU 200 executes the program based on the flowchart shown in FIG. 3 on a predetermined calculation cycle.

In step (which will be denoted hereinafter by S) 100, the ECU 200 determines whether or not the system of the vehicle 1 has shifted from a stopped state to an activated state. If the system of the vehicle 1 has shifted from a stopped state to an activated state (YES in S100), the processing is shifted to S102. Otherwise (NO in S100), the processing is returned to S100.

In S102, the ECU 200 sets the first voltage VB2(0) as an initial value of the target voltage of the DC/DC converter 72 at a time when the system of the vehicle 1 is activated.

In S104, the ECU 200 determines whether or not the left period of the auxiliary battery 74 is longer than the first period α. The first period α is described above, and hence the detailed description thereof will not be repeated. If the left period of the auxiliary battery 74 is longer than the first period α (YES in S104), the processing is shifted to S114. Otherwise (NO in S104), the processing is shifted to S106.

In S106, the ECU 200 determines whether or not the engine 10 has already been started for the first time. The method of determining whether or not the engine 10 has already been started for the first time is described above, and hence the detailed description thereof will not be repeated. If the engine 10 has already been started for the first time (YES in S106), the processing is shifted to S108. Otherwise (NO in S106), the processing is shifted to S112.

In S108, the ECU 200 permits the selection of the fuel economy improvement mode. In S110, the ECU 200 sets the target voltage of the DC/DC converter 72 to the second voltage VB2(1), which is lower than the first voltage VB2(0), and controls the DC/DC converter 72 such that the voltage of the DC/DC converter 72 becomes equal to the second voltage VB2(1) set as the target voltage. In S112, the ECU 200 prohibits the selection of the fuel economy improvement mode.

In S114, the ECU 200 determines whether or not the elapsed time from the activation time point for the system of the vehicle 1 is longer than the second period β. The second period β is described above, and hence the detailed description thereof will not be repeated. If the elapsed time from the activation time point for the system of the vehicle 1 is longer than the second period β (YES in S114), the processing is shifted to S108. Otherwise (NO in S114), the processing is shifted to S116. In S116, the ECU 200 prohibits the selection of the fuel economy improvement mode.

The operation of the ECU 200 mounted on the vehicle according to this embodiment of the invention, which is based on the foregoing structure and the foregoing flowchart, will be described with reference to FIGS. 4A to 4C.

For example, it is assumed that the system of the vehicle 1 and the engine 10 are in a stopped state. Further, it is assumed that the second voltage VB2(1) is set as a target voltage of the DC/DC converter 72, and that the selection of the fuel economy improvement mode is prohibited.

In Case Where Left Period is Longer than First Period α

When the system of the vehicle 1 has shifted from a stopped state to an activated state (YES in S100) through the operation of the start switch 150 by the driver or the like at a time T(0), the first voltage VB2(0) is set as an initial value of the target voltage (S102). Then, the DC/DC converter 72 is controlled such that the voltage supplied from the DC/DC converter 72 to the auxiliary battery 74 becomes equal to the first voltage VB2(0) as the target voltage. Thus, the auxiliary battery 74 is charged.

In this case, the left period of the auxiliary battery 74 is longer than the first period a (YES in S104). Therefore, when the second period β has not elapsed from the activation time point for the system of the vehicle 1 (NO in S114), the selection of the fuel economy improvement mode is prohibited (S116).

Figure 4A:
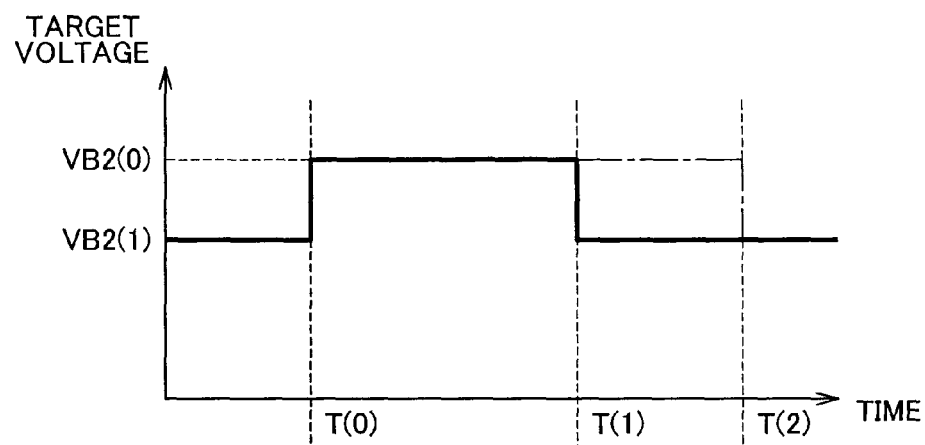
FIGS. 4A to 4C are timing charts each showing an operation of the ECU mounted on the vehicle according to the first embodiment of the invention.
Figure 4B:
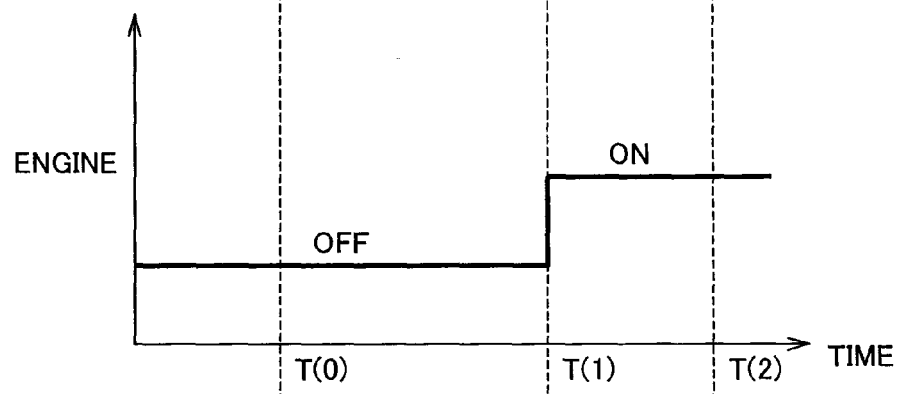
Figure 4C:
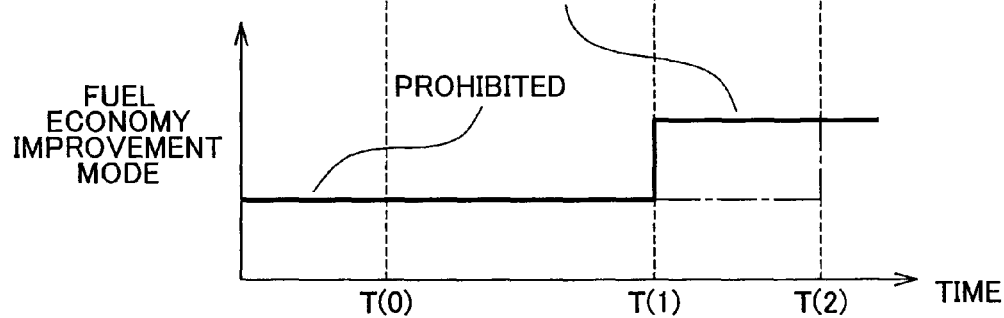

When the second period β has elapsed from the activation time point for the system of the vehicle 1 (YES in S114) at a time T(2), the selection of the fuel economy improvement mode is permitted (S108) as indicated by an alternate long and short dash line of FIG. 4C, and the target voltage is lowered from the first voltage VB2(0) to the second voltage VB2(1) (S110) as indicated by an alternate long and short dash line of FIG. 4A.

In Case Where Left Period is Equal to or Shorter than First Period α

When the system of the vehicle 1 has shifted from a stopped state to an activated state (YES in S100) through the operation of the start switch 150 by the driver or the like at the time T(0), the first voltage VB2(0) is set as an initial value of the target voltage (S102). Then, the DC/DC converter 72 is controlled such that the voltage supplied from the DC/DC converter 72 to the auxiliary battery 74 becomes equal to the first voltage VB2(0) as the target voltage. Thus, the auxiliary battery 74 is charged.

In this case, the left period of the auxiliary battery 74 is equal to or shorter than the first period α (NO in S104). Therefore, when the engine 10 has not already been started for the first time (NO in S106), the selection of the fuel economy improvement mode is prohibited (S112).

When the engine 10 is started at a time T(1), which precedes the time T(2), the engine 10 has already been started for the first time (YES in S106) at or after the time T(1). Therefore, as indicated by a solid line of FIG. 4C, the selection of the fuel economy improvement mode is permitted (S108), and the target voltage of the DC/DC converter 72 is lowered from the first voltage VB2(0) to the second voltage VB2(1) (S110).

In the manner described above, the vehicle according to this embodiment of the invention makes it possible to determine, on the basis of the left period of the auxiliary battery 74, whether or not the auxiliary battery 74 is left unused for a long time, even in the case where the engine 10 is not started. Thus, the determination on whether or not the auxiliary battery 74 is left unused for a long time is prevented from taking a long time. Further, the DC/DC converter 72 can be swiftly controlled depending on whether or not the auxiliary battery 74 is left unused for a long time. Accordingly, it is possible to provide a vehicle, a control apparatus for the vehicle, and a control method for the vehicle that restrain a deterioration in fuel economy while avoiding the unnecessary consumption of electric power.

In this embodiment of the invention, the activation time point for the system of the vehicle 1 has been described as a time point when the SMR 76 switches from a shutoff state to a conductive state. However, for example, the activation time point for the system of the vehicle 1 may also be a time point when the driver operates the start switch 150 to activate the system of the vehicle 1 (a time point when the ST signal is received from the start switch 150).

Second Embodiment

A vehicle according to the second embodiment of the invention will be described hereinafter. The vehicle according to this embodiment of the invention is different from the vehicle according to the foregoing first embodiment of the invention in the operation of the completion determination unit 208. The vehicle according to this embodiment of the invention is identical in other configurational details to the vehicle according to the foregoing first embodiment of the invention. Components identical to those of the first embodiment of the invention are denoted by the same reference symbols respectively. The components denoted by the same reference symbol are identical to one another in function as well. Accordingly, the detailed description of those components will not be repeated below.

In this embodiment of the invention, if the elapsed time from the activation time point for the system of the vehicle 1 is longer than a third period γ, the completion determination unit 208 determines that the preheating of the air-fuel ratio sensor 18 is completed. The third period γ is a predetermined period that is shorter than the first period α and the second period β The third period γ is a period from the activation time point for the system of the vehicle 1 to a time point when the temperature of the air-fuel ratio sensor 18 becomes equal to or higher than a predetermined temperature, namely, if the preheating of the air-fuel ratio sensor 18 is completed, after the start of the preheating of the air-fuel ratio sensor 18. The predetermined temperature may be any temperature as long as the difference between the temperature of a detecting element of the air-fuel ratio sensor 18 and the temperature of exhaust gas is reduced. For example, the completion determination unit 208 may determine whether or not the preheating of the air-fuel ratio sensor 18 is completed if the left determination flag is off, and may turn the completion determination flag on if it is determined that the preheating of the air-fuel ratio sensor 18 is completed.

The control structure of a program executed by the ECU 200 mounted on the vehicle 1 according to this embodiment of the invention will be described with reference to FIG. 5. The ECU 200 executes the program based on the flowchart shown in FIG. 5 on a predetermined calculation cycle.

Figure 5:
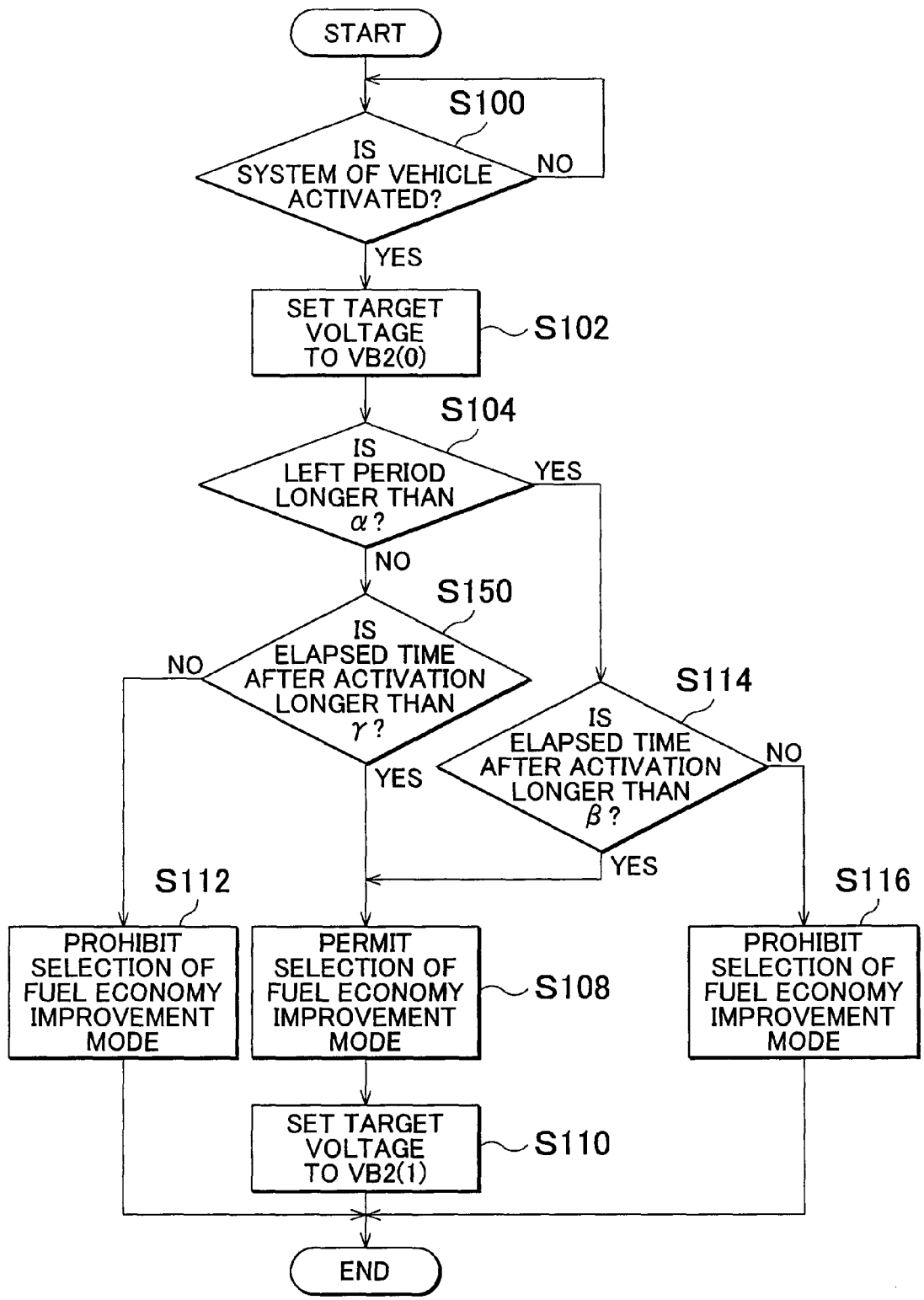
FIG. 5 is a flowchart showing a control structure of a program executed by an ECU mounted on a vehicle according to the second embodiment of the invention.

It should be noted that in the flowchart shown in FIG. 5, those processing steps which are the same as in the aforementioned flowchart shown in FIG. 3 are denoted by the same step numbers respectively. The processing steps denoted by the same step number are identical to one another in the processing contents as well. Accordingly, the detailed description of those processing steps will not be repeated below.

If the left period of the auxiliary battery 74 is equal to or shorter than the first period α (NO in S104), the ECU 200 determines in S150 whether or not the elapsed time from the activation time point for the system of the vehicle 1 is longer than the third period γ. If the elapsed time from the activation time point for the system of the vehicle 1 is longer than the third period γ (YES in S150), the processing is shifted to S108. Otherwise (NO in S150), the processing is shifted to S112.

The operation of the ECU 200 mounted on the vehicle 1 according to this embodiment of the invention, which is based on the foregoing structure and the foregoing flowchart, will be described with reference to FIGS. 6A to 6C. An operation in a case where the left period of the auxiliary battery 74 is longer than the first period a is identical to the operation of the ECU 200 mounted on the vehicle 1 according to the foregoing first embodiment of the invention. Therefore, the detailed description of the operation will not be repeated.

In Case Where Left Period is Equal to or Shorter than First Period α

Figure 6A:
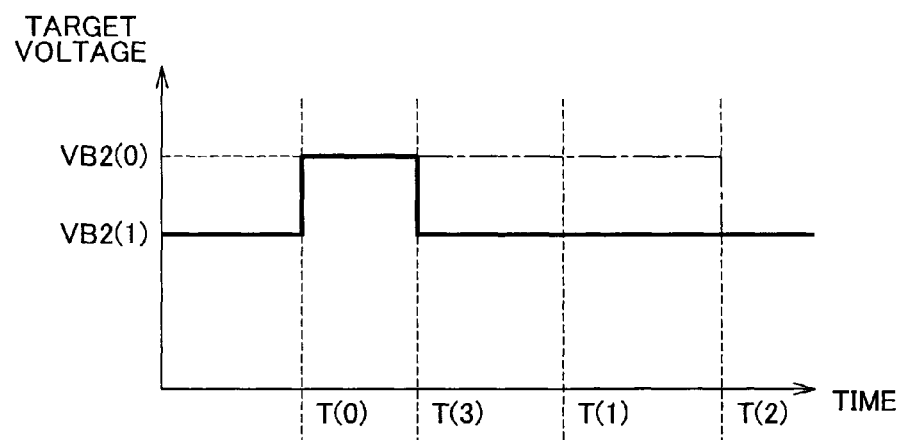
FIGS. 6A to 6C are timing charts each showing an operation of the ECU mounted on the vehicle according to the second embodiment of the invention.
Figure 6B:
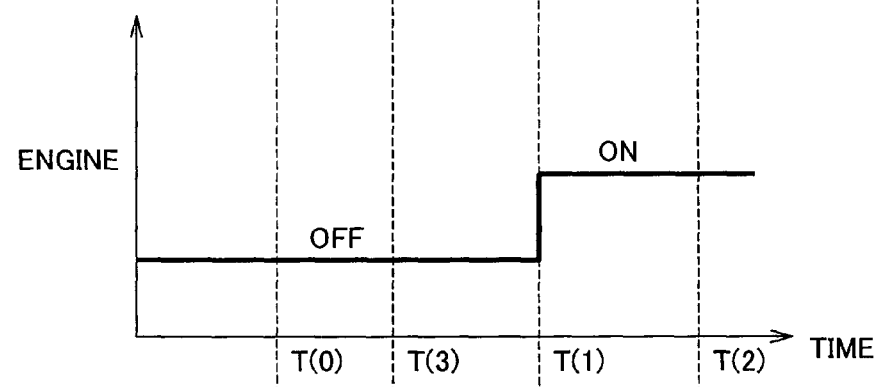
Figure 6C:
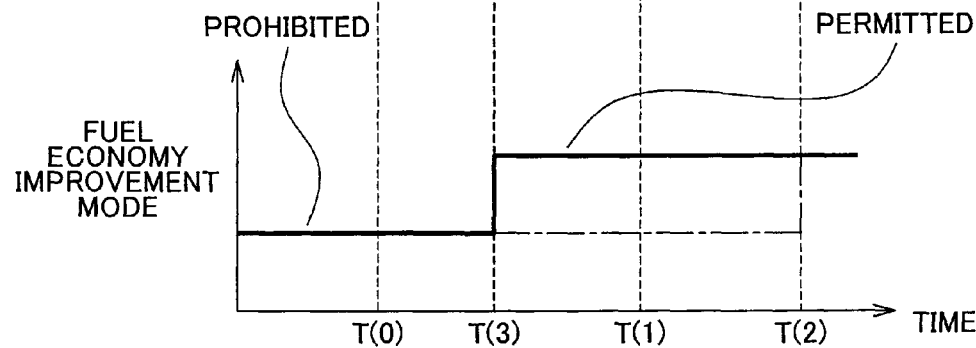

As shown in FIGS. 6A to 6C, when the system of the vehicle 1 has shifted from a stopped state to an activated state (YES in S100) through the operation of the start switch 150 by the driver or the like at the time T(0), the first voltage VB2(0) is set as an initial value of the target voltage (S102). Then, the DC/DC converter 72 is controlled such that the voltage supplied from the DC/DC converter 72 to the auxiliary battery 74 becomes equal to the first voltage VB2(0) as the target voltage. Thus, the auxiliary battery 74 is charged.

In this case, the left period of the auxiliary battery 74 is equal to or shorter than the first period α (NO in S104). Therefore, when the elapsed time from the activation time point for the system of the vehicle 1 is equal to shorter than the third period γ (NO in S150), the selection of the fuel economy improvement mode is prohibited (S112).

When the elapsed time from the activation time point for the system of the vehicle 1 is longer than the third period γ (YES in S150) at a time T(3), which precedes the time T(1) when the engine 10 is started, the selection of the fuel economy improvement mode is permitted (S108) as indicated by a solid line of FIG. 6C, and the target voltage of the DC/DC converter 72 is lowered from the first voltage VB2(0) to the second voltage VB2(1) (S110) as indicated by a solid line of FIG. 6A.

In the manner described above, in addition to the function and effect of the invention described in the foregoing first embodiment of the invention, the vehicle according to this embodiment of the invention makes it possible to lower the target voltage of the DC/DC converter 72 after the completion of the preheating of the air-fuel ratio sensor 18, regardless of whether or not the engine 10 is started. Therefore, the unnecessary consumption of electric power can be avoided.

Although it has been described in this embodiment of the invention that the ECU 200 determines that the preheating of the air-fuel ratio sensor 18 is completed if the elapsed time from the activation time point for the system of the vehicle 1 is longer than the third period γ, the invention is not limited thereto. For example, the ECU 200 may determine that the preheating of the air-fuel ratio sensor 18 is completed if the resistance value of the air-fuel ratio sensor 18 is equal to or lower than a threshold. This is because the resistance value of the air-fuel ratio sensor 18 increases as the temperature of the air-fuel ratio sensor 18 falls, and decreases as the temperature of the air-fuel ratio sensor 18 rises.

Third Embodiment

A vehicle according to the third embodiment of the invention will be described hereinafter. In addition to the operation of the ECU 200 mounted on the vehicle 1 in the foregoing first embodiment of the invention, the vehicle according to this embodiment of the invention performs an operation of raising the target voltage of the auxiliary battery 74 immediately before the start of the engine 10. Accordingly, the configuration other than what will be described hereinafter is identical to the configuration of the vehicle 1 according to the foregoing first embodiment of the invention, which has been described using FIGS. 1 and 2. Components identical to those of the first embodiment of the invention are denoted by the same reference symbols respectively. The components denoted by the same reference symbol are identical to one another in function as well. Accordingly, the detailed description of those components will not be repeated below.

In this embodiment of the invention, the ECU 200 sets the target voltage to the first voltage VB2(0) immediately before the initial start of the engine 10 that follows the activation of the system of the vehicle 1. Furthermore, the ECU 200 sets the target voltage to the second voltage VB2(1) when the engine 10 is stopped.

Figure 7:
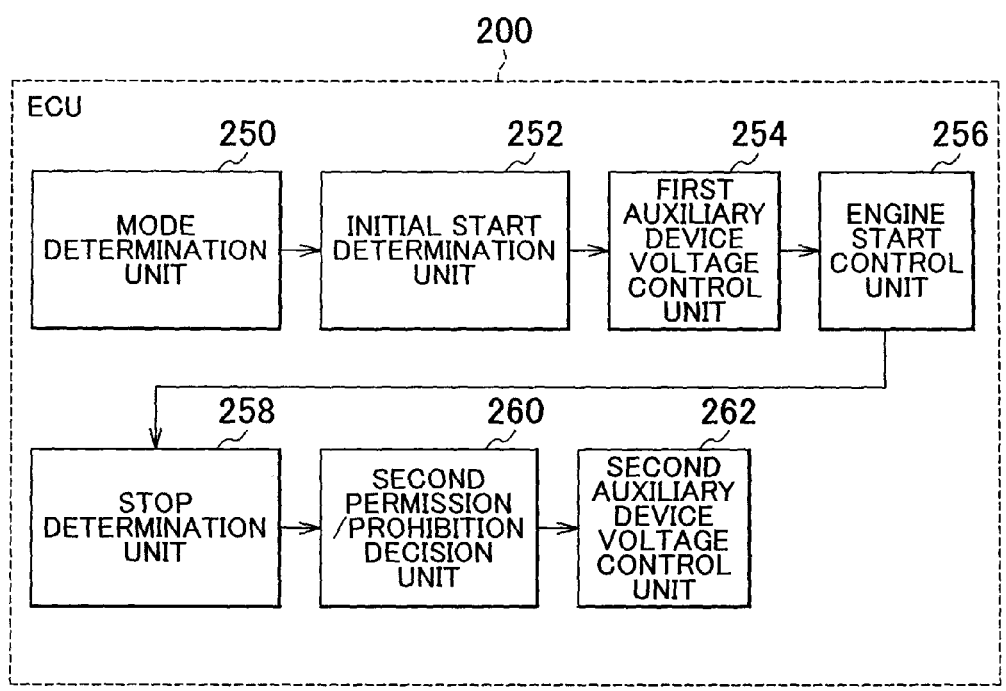
FIG. 7 is a functional block diagram of an ECU mounted on a vehicle according to the third embodiment of the invention.

FIG. 7 shows a functional block diagram of the ECU 200 mounted on the vehicle 1 according to this embodiment of the invention. In addition to the configuration illustrated in FIG. 2, as shown in FIG. 7, the ECU 200 further includes a mode determination unit 250, an initial start determination unit 252, a first auxiliary device voltage control unit 254, an engine start control unit 256, a stop determination unit 258, a second permission/prohibition decision unit 260, and a second auxiliary device voltage control unit 262.

The mode determination unit 250 determines whether or not the fuel economy improvement mode is selected. For example, the mode determination unit 250 may determine that the fuel economy improvement mode is selected if the aforementioned selection permission flag for the fuel economy improvement mode is on, and may determine that the fuel economy improvement mode is not selected if the selection permission flag is off. For example, the mode determination unit 250 may turn a mode determination flag on if it is determined that the fuel economy improvement mode is selected.

The initial start determination unit 252 determines whether or not it is an initial start timing for the engine 10 (a timing for starting the engine 10 for the first time). For example, if the engine 10 is not started after the activation of the system of the vehicle 1 and a condition for starting the engine 10 is fulfilled, the initial start determination unit 252 determines that it is the initial start timing for the engine 10. The condition for starting the engine 10 includes, for example, a condition that the SOC of the main battery 70 be smaller than a threshold, but is not limited to this condition. For example, the initial start determination unit 252 may turn an initial start determination flag on if it is determined that it is the initial start timing for the engine 10.

If the mode determination unit 250 determines that the fuel economy improvement mode is selected and the initial start determination unit 252 determines that it is the initial start timing for the engine 10, the first auxiliary device voltage control unit 254 sets the target voltage to the first voltage VB2(0). For example, the first auxiliary device voltage control unit 254 may set the target voltage to the first voltage VB2(0) if the mode determination flag is on and the initial start determination flag is on. The first auxiliary device voltage control unit 254 controls the DC/DC converter 72 such that the voltage VB2 detected by the second voltage sensor 162 becomes equal to the target voltage.

The engine start control unit 256 performs start control for starting the engine 10 after the first voltage VB2(0) is set as a target voltage. The start control includes the control of rotating the first MG 20 such that the engine rotational speed Ne becomes equal to or higher than a rotational speed that allows a first explosion, throttle control, fuel injection control, and ignition control.

The stop determination unit 258 determines whether or not the engine 10 is stopped. For example, if the engine rotational speed Ne is substantially equal to zero, the stop determination unit 258 determines that the engine 10 is stopped.

The stop determination unit 258 may determine that the engine 10 is stopped if the condition for starting the engine 10 is not fulfilled after the lapse of a predetermined time after the fulfillment of a condition for stopping the engine 10 during the operation of the engine 10, or may determine that the engine 10 is stopped if the engine rotational speed Ne has shifted from a state of being equal to or higher than a predetermined rotational speed to a state of being substantially equal to zero. The stop determination unit 258 may turn a stop determination flag on if it is determined that the engine 10 is stopped, for example.

The second permission/prohibition decision unit 260 decides, on the basis of a result of a determination made by the stop determination unit 258, whether to permit or prohibit the selection of the fuel economy improvement mode. For example, the second permission/prohibition decision unit 260 permits the selection of the fuel economy improvement mode if the stop determination unit 258 determines that the engine 10 is stopped, and prohibits the selection of the fuel economy improvement mode if the stop determination unit 258 determines that the engine 10 is in operation.

The second permission/prohibition decision unit 260 may turn on the selection permission flag for the fuel economy improvement mode if the stop determination flag is on, and may turn off the selection permission flag for the fuel economy improvement mode if the stop determination flag is off, for example.

If the selection of the fuel economy improvement mode is permitted, the second auxiliary device voltage control unit 262 sets the target voltage to the second voltage VB2(1). Further, if the selection of the fuel economy improvement mode is prohibited, the second auxiliary device voltage control unit 262 sets the target voltage to the first voltage VB2(0). The second auxiliary device voltage control unit 262 controls the DC/DC converter 72 such that the voltage supplied from the DC/DC converter 72 to the auxiliary battery 74, namely, the voltage VB2 detected by the second voltage sensor 162 becomes equal to the set target voltage.

The second auxiliary device voltage control unit 262 may set the target voltage to the second voltage VB2(1) if the selection permission flag is on, and may set the target voltage to the first voltage VB2(0) if the selection permission flag is off.

In this embodiment of the invention, the mode determination unit 250, the initial start determination unit 252, the first auxiliary device voltage control unit 254, the engine start control unit 256, the stop determination unit 258, the second permission/prohibition decision unit 260, and the second auxiliary device voltage control unit 262, all of which function as software, are realized through the execution of a program stored in the memory by the CPU of the ECU 200, but may also be realized by hardware. Such a program is stored in a storage medium, which is mounted on the vehicle.

Figure 8:
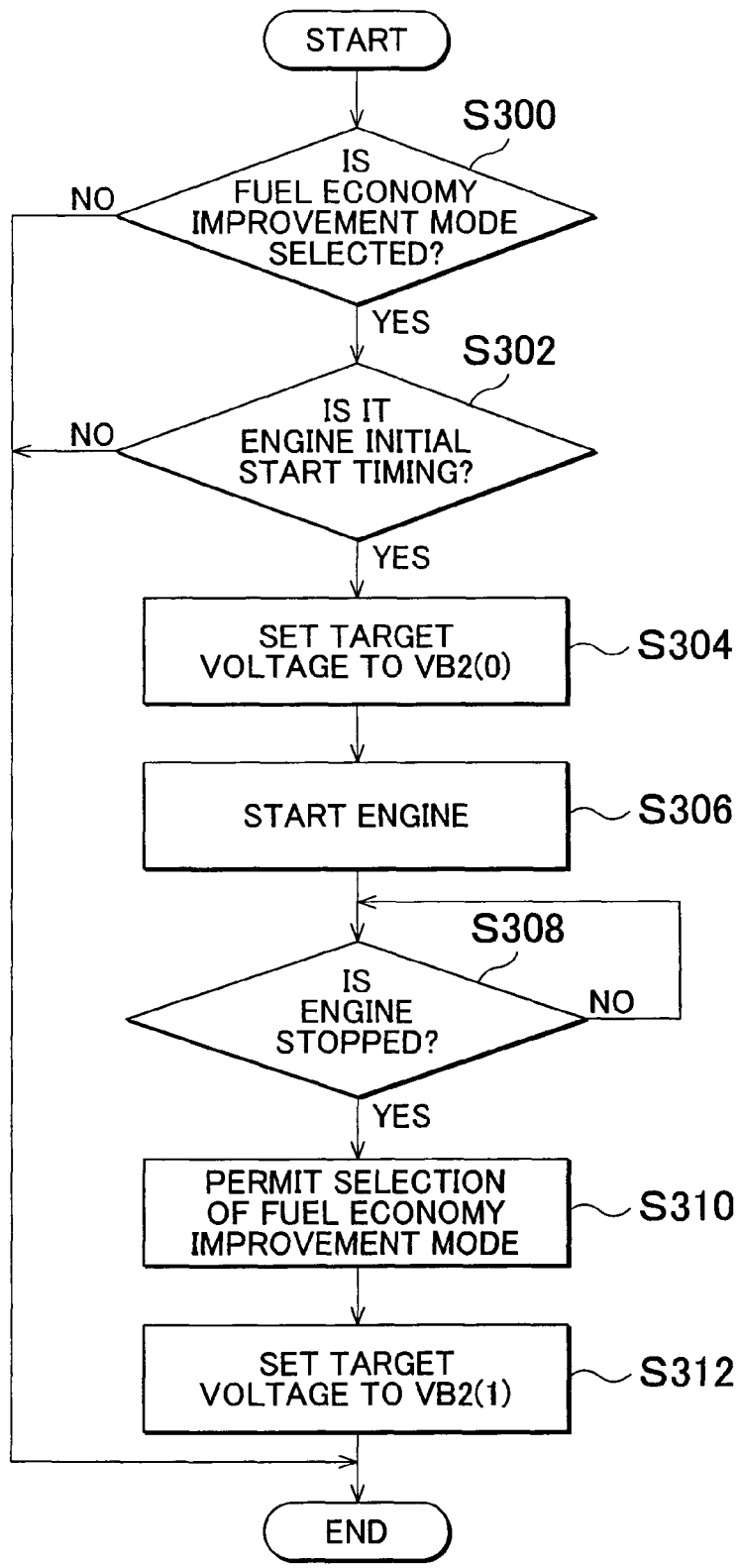
FIG. 8 is a flowchart showing a control structure of a program executed by the ECU mounted on the vehicle according to the third embodiment of the invention.

Referring to FIG. 8, the control structure of the program executed by the ECU 200 mounted on the vehicle 1 according to this embodiment of the invention will be described. The ECU 200 executes the program based on the flowchart shown in FIG. 8 on a predetermined calculation cycle.

In S300, the ECU 200 determines whether or not the fuel economy improvement mode is selected. If the fuel economy improvement mode is selected (YES in S300), the processing is shifted to S302. Otherwise (NO in S300), this processing is terminated.

In S302, the ECU 200 determines whether or not it is an initial start timing for the engine 10. The method of determining whether or not it is the initial start timing for the engine 10 is described above, and hence, the detailed description thereof will not be repeated. If it is the initial start timing for the engine 10 (YES in S302), the processing is shifted to S304. Otherwise (NO in S302), this processing is terminated.

In S304, the ECU 200 set a target voltage of the DC/DC converter 72 to the first voltage VB2(0). In S306, the ECU 200 starts the engine 10.

In S308, the ECU 200 determines whether or not the engine 10 is stopped. If the engine 10 is stopped (YES in S308), the processing is shifted to S310. Otherwise (NO in S308), the processing is returned to S308.

In S310, the ECU 200 permits the selection of the fuel economy improvement mode. In S312, the ECU 200 sets the target voltage to the second voltage VB2(1).

The operation of the ECU 200 mounted on the vehicle 1 according to this embodiment of the invention, which is based on the foregoing structure and the foregoing flowchart, will be described with reference to FIGS. 9A to 9C.

For example, it is assumed that the vehicle 1 is propelled by the power of the second MG 30 with the engine 10 stopped, and the fuel economy improvement mode is selected (i.e., the selection of the fuel economy improvement mode is permitted).

Figure 9A:
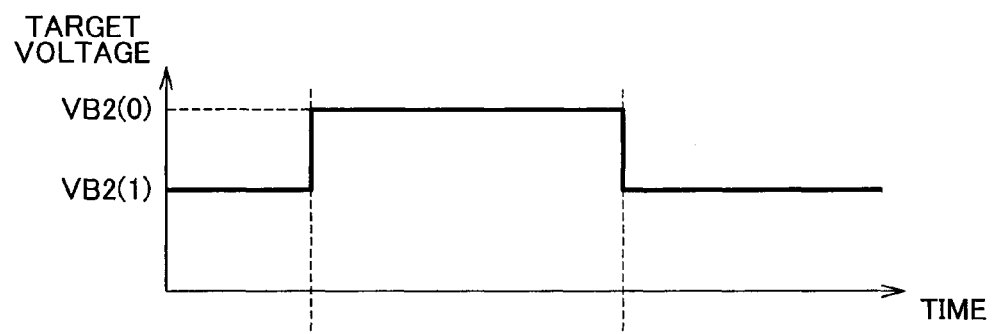
FIGS. 9A to 9C are timing charts each showing an operation of the ECU mounted on the vehicle according to the third embodiment of the invention.
Figure 9B:
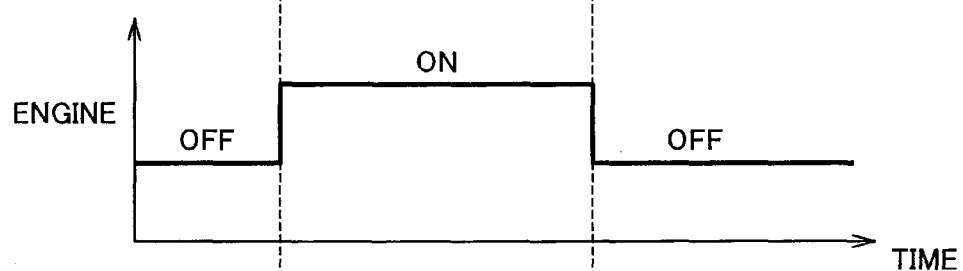
Figure 9C:
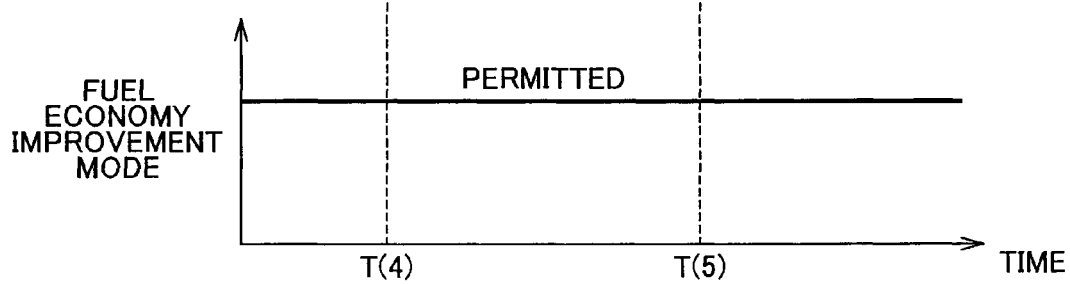

As shown in FIGS. 9A to 9C, when the fuel economy improvement mode is selected (YES in S300) and it is determined that it is the initial start timing for the engine 10 (YES in S302) at the time T(4), the first voltage VB2(0) is set as a target voltage (S304). Due to a rise in the target voltage of the DC/DC converter 72, the voltage supplied from the DC/DC converter 72 to the auxiliary battery 74 rises. The engine 10 is started in this state (S306). Then, when the engine 10 is not started (NO in S308), the first voltage VB2(0) is maintained as a target voltage.

When the engine 10 is stopped (YES in S308) at a time T(5), the selection of the fuel economy improvement mode is permitted (S310), and the second voltage VB2(1) is set as a target voltage (S312). Due to a fall in the target voltage of the DC/DC converter 72, the voltage supplied from the DC/DC converter 72 to the auxiliary battery 74 falls.

In the manner described above, in addition to the operation and effect of the invention described in the foregoing first embodiment of the invention, the vehicle according to this embodiment of the invention makes it possible to improve the starting performance of the engine 10, the exhaust emission properties, and the like, because stable combustion is ensured in the engine 10 by raising the target voltage of the DC/DC converter 72 until the engine 10 is stopped during the initial start of the engine 10. Further, since the target voltage is maintained until the engine 10 is stopped, stable combustion can be ensured.

Although the target voltage is raised until the engine 10 is stopped during the initial start of the engine 10 in this embodiment of the invention, the target voltage may be reduced as soon as the start of the engine 10 is completed.

The embodiments of the invention disclosed this time should be considered to be exemplary in all respects and non-restrictive. The scope of the invention is not defined by the foregoing description but by the claims. The invention is intended to encompass all modifications that are equivalent in sense and scope to the claims.

The invention claimed is:

1. A vehicle comprising:
a first electric storage device that supplies an electric power to an electric rotating machine that is a drive source;
a second electric storage device that supplies an electric power to an electric component different from the electric rotating machine and has a lower voltage than the first electric storage device;
a converter that adjusts a voltage of the electric power supplied from the first electric storage device and supplies the voltage-adjusted electric power at least to the second electric storage device; and
a control unit that controls the converter such that the voltage of the electric power supplied from the first electric storage device to the second electric storage device becomes equal to a target voltage, wherein
the control unit sets the target voltage to a first voltage if a system stop period from a last stop time point when a system of the vehicle is stopped to an activation time point when the system of the vehicle is activated is longer than a first period, and sets the target voltage to a second voltage, which is lower than the first voltage, if the system stop period is equal to or shorter than the first period.

2. The vehicle according to claim 1, wherein the first voltage is a voltage at which the second electric storage device is charged with the electric power of the first electric storage device.

3. The vehicle according to claim 2, wherein the control unit sets the target voltage to the first voltage at the activation time point.

4. The vehicle according to claim 1, further comprising an operation unit that is operated by a driver, wherein
the activation time point is a time point at which the operation unit is operated when the system of the vehicle is in a stopped state,
the stop time point is a time point at which the operation unit is operated last time when the system of the vehicle is in an activated state, and
the system stop period is a period from the last stop time point to the activation time point after the last stop time point.

5. The vehicle according to claim 1, wherein
when the system stop period is longer than the first period, the control unit sets the target voltage to the second voltage if an elapsed time from the activation time point is longer than a second period, and sets the target voltage to the first voltage if the elapsed time from the activation time point is equal to or shorter than the second period, and
the second period is shorter than the first period.

6. The vehicle according to claim 1, wherein the drive source includes an internal combustion engine.

7. The vehicle according to claim 6, wherein the control unit sets the target voltage to the second voltage after completion of preheating of an air-fuel ratio sensor that is provided in the internal combustion engine, if the system stop period is equal to or shorter than the first period.

8. The vehicle according to claim 7, wherein the control unit determines that the preheating is completed if start of the internal combustion engine is completed after the activation time point, and sets the target voltage to the second voltage.

9. The vehicle according to claim 7, wherein the control unit determines that the preheating is completed if the elapsed time from the activation time point is longer than a third period, and sets the target voltage to the second voltage.

10. The vehicle according to claim 6, wherein the control unit sets the target voltage to the first voltage immediately before the internal combustion engine is started for a first time after the activation time point, and sets the target voltage to the second voltage when the internal combustion engine is stopped.

11. The vehicle according to claim 1, wherein
the drive source includes an internal combustion engine,
the control unit sets the target voltage to the first voltage immediately before the internal combustion engine is started for a first time after the activation time point, and sets the target voltage to the second voltage when the internal combustion engine is stopped.

12. A control apparatus for a vehicle that is mounted with a first electric storage device, a second electric storage device, and a converter, comprising:
a control unit that sets a target voltage to a first voltage if a system stop period from a last stop time point when a system of the vehicle is stopped to an activation time point when the system of the vehicle is activated is longer than a first period,
sets the target voltage to a second voltage, which is lower than the first voltage, if the system stop period is equal to or shorter than the first period, and
controls the converter such that a voltage of an electric power supplied from the first electric storage device to the second electric storage device becomes equal to the target voltage, wherein
the first electric storage device supplies an electric power to an electric rotating machine as a drive source,
the second electric storage device supplies an electric power to an electric component different from the electric rotating machine, and has a lower voltage than the first electric storage device, and
the converter adjusts the voltage of the electric power supplied from the first electric storage device, and supplies the voltage-adjusted electric power at least to the second electric storage device.

13. A control method for a vehicle that is mounted with a first electric storage device, a second electric storage device, and a converter, comprising:
setting a target voltage to a first voltage if a system stop period from a last stop time point when a system of the vehicle is stopped to an activation time point when the system of the vehicle is activated is longer than a first period;
setting the target voltage to a second voltage, which is lower than the first voltage, if the system stop period is equal to or shorter than the first period; and
controlling the converter such that a voltage of an electric power supplied from the first electric storage device to the second electric storage device becomes equal to the target voltage, wherein
the first electric storage device supplies an electric power to an electric rotating machine as a drive source,
the second electric storage device supplies an electric power to an electric component different from the electric rotating machine, and has a lower voltage than the first electric storage device, and
the converter adjusts the voltage of the electric power supplied from the first electric storage device, and supplies the voltage-adjusted electric power at least to the second electric storage device.

* * * * *